a horse recovery supplement patent cover page

US011058139B2

(12) United States Patent
Langhorne

(10) Patent No.: US 11,058,139 B2
(45) Date of Patent: Jul. 13, 2021

(54) RECOVERY SUPPLEMENT FOR HORSES

(71) Applicant: Kerri Ann Langhorne, Stafford, VA (US)

(72) Inventor: Kerri Ann Langhorne, Stafford, VA (US)

( * ) Notice: Subject to any disclaimer, the term of this patent is extended or adjusted under 35 U.S.C. 154(b) by 411 days.

(21) Appl. No.: 16/026,578

(22) Filed: Jul. 3, 2018

(65) Prior Publication Data

US 2020/0008457 A1 Jan. 9, 2020

(51) Int. Cl.
A23L 33/175 (2016.01)
A23L 33/115 (2016.01)
A23K 20/158 (2016.01)
A23K 20/142 (2016.01)

(52) U.S. Cl.
CPC .......... *A23L 33/175* (2016.08); *A23L 33/115* (2016.08); *A23K 20/142* (2016.05); *A23K 20/158* (2016.05)

(58) Field of Classification Search
CPC ... A23L 33/175; A23L 33/115; A23K 20/142; A23K 20/158
See application file for complete search history.

(56) References Cited

U.S. PATENT DOCUMENTS

| 5,968,896 | A | * | 10/1999 | Bell | A23L 33/115 514/168 |
|---|---|---|---|---|---|
| 7,141,265 | B2 | * | 11/2006 | Sakuma | A21D 2/16 426/601 |
| 7,404,976 | B2 | * | 7/2008 | Lepine | A23C 11/04 426/2 |
| 8,846,759 | B2 | * | 9/2014 | Luiking | A61K 38/1709 514/561 |
| 8,940,689 | B2 | * | 1/2015 | Di Pietro | A61K 33/42 514/4.8 |
| 9,596,870 | B2 | * | 3/2017 | Zanghi | A23K 20/163 |
| 2003/0194423 | A1 | * | 10/2003 | Torney | A23K 10/18 424/442 |
| 2003/0202992 | A1 | * | 10/2003 | Fuchs | A23L 29/065 424/283.1 |
| 2004/0081708 | A1 | * | 4/2004 | Baxter | A23L 33/40 424/722 |
| 2005/0153019 | A1 | * | 7/2005 | Fuchs | A23L 33/15 426/72 |
| 2008/0220126 | A1 | * | 9/2008 | Boileau | A23K 20/158 426/61 |
| 2008/0248156 | A1 | * | 10/2008 | Boileau | A23K 50/40 426/2 |
| 2009/0075862 | A1 | * | 3/2009 | Boza | A61P 1/00 514/1.1 |
| 2009/0215900 | A1 | * | 8/2009 | Gross | A61P 37/00 514/563 |
| 2010/0303990 | A1 | * | 12/2010 | Brooks | A23D 7/0056 426/541 |
| 2011/0250310 | A1 | * | 10/2011 | Mateus | A23C 21/10 426/2 |
| 2012/0093973 | A1 | * | 4/2012 | Parthasarathy | A23K 20/174 426/2 |
| 2012/0322726 | A1 | * | 12/2012 | Somoto | A61P 3/00 514/4.8 |
| 2013/0202763 | A1 | * | 8/2013 | Prakash | A23L 27/84 426/548 |
| 2014/0171519 | A1 | * | 6/2014 | Prakash | C07H 15/256 514/777 |
| 2014/0308390 | A1 | * | 10/2014 | Greenberg | A61P 3/06 426/2 |
| 2015/0004279 | A1 | * | 1/2015 | Zanghi | A23K 20/142 426/2 |
| 2015/0305361 | A1 | * | 10/2015 | Holz-Schietinger | A23L 25/40 426/62 |
| 2015/0374013 | A1 | * | 12/2015 | Harris | A61K 31/732 424/195.16 |
| 2016/0174588 | A1 | * | 6/2016 | Mateus | A23L 33/40 426/72 |
| 2017/0150738 | A1 | * | 6/2017 | Zanghi | A23K 20/147 |
| 2018/0184684 | A1 | * | 7/2018 | Cox | A23G 9/38 |
| 2018/0317521 | A1 | * | 11/2018 | Harris | A61K 36/258 |
| 2019/0045810 | A1 | * | 2/2019 | Khoo | A61P 17/02 |
| 2020/0108040 | A1 | * | 4/2020 | Kunugi | A61K 35/20 |
| 2021/0007383 | A1 | * | 1/2021 | Elonis | A23L 27/13 |

* cited by examiner

Primary Examiner — Kevin R Kruer

(57) ABSTRACT

A horse recovery supplement comprised of immediately digestible and absorbable essential amino acids required by the body to build and restore muscle fibers and improve gastrointestinal health. Ingredients include a mixture of whey protein, soybean oil, coconut oil, and/or glutamine. The product is to be given orally for daily consumption and may be used by all horses to facilitate optimal health.

6 Claims, No Drawings

RECOVERY SUPPLEMENT FOR HORSES

CROSS-REFERENCE TO RELATED APPLICATIONS

US Patent, US20070009502A1, is a supplement for recovery of sick animals focusing on vitamins and minerals, however, lacking the nutritional support of amino acids for muscle development to decrease chances of atrophy.

U.S. Pat. No. 6,232,346B1, is a supplement for preventive recovery and does have amino acids, however, does not cover all the essential amino acids for muscle support in proper recovery and gastrointestinal support for the stresses found most common in performance horses. In addition, there are some concerns with Creatine being added that could harm the kidney, liver, or disrupt heart function. Creatine can cause stomach pain, diarrhea, and muscle cramping, because it causes muscles to draw water from the rest of the body, and some show signs of dehydration while consuming additional Creatine supplementation. These negative effects have not been proven, however, this supplement validates otherwise.

BACKGROUND OF THE INVENTION

(1) Field of the Invention

This invention relates to the field of nutrition and preventative health measures through a dietary formulation for the animals, more particularly, nutritional supplements for horses that restores the essential nutrients of amino acids that are lost during training, exercise, and competition, while supporting the gastrointestinal tract, which is susceptible to stress induced complications. Therefore, these essential nutrients must be obtained by the horse's diet, for they cannot be synthesized by the horse. Amino acids are crucial and need to be replenished on a daily basis because insignificant amounts of amino acids can cause the inability to maintain proper body function.

My horse, Bella, became sick back in November 2013 and ended up at Marion duPont Scott Equine Medical Center where they performed two (2) intense colic surgeries. The veterinarians surgically removed nine (9) feet of the deteriorating portions of her GI tract. Then, two (2) adhesions formed during recovery, where they had sewn the healthy parts back together, giving her only seven days to live. Veterinarians, farriers, family, and friends constantly told me I was silly for not signing a document to put her down knowing that she would be suffering. Despite what everyone else told me, I asked for enough medicine and IV food that would keep her alive to get her home. They released her in my care with the clear indication that she was going to die within seven days, and that I was only buying time. That was not an acceptable answer. After trying several different concoctions, my determination paid off when this invention was discovered. This product prolonged Bella's life two years and seven months, longer than any other veterinarian or professional in the horse world thought possible. Not only was she alive, but she was able to go back to full training and compete at top levels that included fourth level dressage. This invention has further helped many horses in maintaining an overall healthy state, while aiding in reducing complications from overtraining, lack of muscle support, while maintaining the intestinal support that horses endure on a daily basis when training, exercising or competing. The current manufacturers of horse feed that are made in today's market does not meet the necessary requirements to maintain healthy conditions to sustain standard health. Therefore, I created my own.

(2) Description of Related Art including information disclosed under 37 CFR 1.97 and 1.98

Most manufacturers of horse feed today are producing unreliable sources of nutrients and overlooking the fact that their product is not being digested properly into the intestinal walls for the effective absorption of nutritional needs. WellSolve Well-Gel is the only product that comes semi close to this new recovery supplement that has been developed. Well-Gel is a nutrient-dense powdered supplement that, when mixed with water, can be pumped through a nasogastric tube to supply essential nutrients to horses that are unable to voluntarily consume feed. Once healthy enough, horses are taken off this product and returned to normal dietary habits. Well-Gel, though it contains whey protein, is not an effective source of protein as a daily recovery supplement, nor does it have the general makeup of soothing intestinal stress related issues that come along with training. Their ingredients are not of what this recovery supplement is. Well-Gel lacks the nutrients needed to replenish the lost nutrients during training, exercise and/or competition. Wellsolve Well-Gel is formulated for neglected, malnourished horses that are too emaciated or too weak to eat, as well as a horse coming out of surgery.

The most contributing factors leading to a decrease in horse health, performance, and functionality is due to the overload of carbohydrates and fatty acids received through their diet. This overload is setting up a cascade of events leading to the appearance of diseases such as colic, laminitis, founder, azoturia, equine rhabdomyolysis syndrome (ERS) and gastric ulcers. When muscles are not supported or developed properly, breakdown of the whole body will occur over time as well as decrease in performance leading to injuries or death. It is also common for horses to suffer from muscle injuries that go unnoticed due to unavailable digestible protein and essential nutrients in their diet. There is a loophole in manufacturing of horse feed that comprises the ability for the horse to breakdown and absorb the protein and digest the amino acids, leading to malnutrition with not enough gastrointestinal support for recovery. Feed companies are finding cheaper alternatives to feed carbs and fat instead of healthy, digestible protein. Many horses have some type of injury related to poor nutrition and, as a consequence, they never reach their full potential. The horse's diet is important in maintaining general health, performance, energy levels, and body composition. A horse's diet must include proper amounts of essential nutrients that are both digestible and absorbable for the body to thrive. Since the time horses have been domesticated, the demand of essential nutritional support has increased but the formulation of the feed has not been modified to accommodate performance. Demands on the physical and energetic systems in the horse athlete at the time of performance may lead to depression of immune system in the hours immediately following performance. Supplementation with a recovery amino acid formulation will aid the horse athlete to effectively recover after such demand.

Horses are suffering from muscular, emotional, and gastrointestinal stress that comes with training, competition, exercise and constant traveling. This recovery supplement for horses is an invention that is very much needed in the horse world and will provide a solution to these deficiencies.

BRIEF SUMMARY OF THE INVENTION

A supplement to provide nutritional replenishment of nutrients that are lost during training, exercise, and competition while providing gastrointestinal support. This invention is meant to increase mechanical energy for training/performing while simultaneously decreasing the delayed onset of fatigue and improving the neuromuscular coordination through a supplement to be added daily to the athlete's regular feed/grain. This supplement is recommended to add a fluid (ex: water, apple juice, Gatorade, or any other sources of liquids approved as sources) for added flavor and easier digestion for the horse or given as a liquid drink after training, exercise, or performance and/or added to their daily feed. This supplement can be given in a liquid or powdered form.

Ideally, taking the recovery powder within 60 minutes at the end of training (after the horse has recovered and reestablished resting heart rate), giving this supplement will flood the bloodstream with essential amino acids, shuttling them into the muscles to lay down new muscle tissue.

DETAILED DESCRIPTION OF THE INVENTION

A protein recovery supplement with gastrointestinal support. This supplementation is meant to only be consumed orally.

Includes, but not limited to: Whey Protein (Concentrate & Isolate), Soybean oil, Coconut oil and Glutamine.

Amounts of each component:
Whey Protein: 30-60 wt %, most preferred 40-50 wt %
Coconut Oil: 25-45 wt %, most preferred 30-35 wt %
Soybean Oil: 5-25 wt %, most preferred 10-15%
Glutamine: 0.25-2.25%, most preferred 0.75-1.25%

Mixing or scooping into (a) food (e.g., grain) and water or (b) apple juice or any liquid of choice with a minimum amount: 8 oz of fluid/liquid substance. If supplement is mixed in liquid forms, shake vigorously (30-45 seconeds) to mix well prior to consuming. If made in powder form, add 8 oz-150 oz of water/apple juice or any other acceptable liquid for horses must be added to the mixture prior to consuming. Additional flavors like peppermint, apple, molasses, cranberry, or any other flavor approved for horses can be added for customized flavor for picky eaters. Unflavored is the preferred flavor but can be flavored to the horse's needs.

This is a daily supplement to given on, but not limited to, a daily basis. Prime/Optimal time for horse to consume, is after they have cooled down completely after exercise, training, or competition but within one hour. This allows faster recovery, and horse replenishes the lost nutrients faster.

Additional Information about the general makeup of this recovery supplement:

Whey Protein Blend of Amino Acids in this invention include: Alanine, Arginine, Aspartate, Cystine, Glutamic Acid, Glycine, Histidine, Isoleucine (BCAA), Leucine (BCAA), Lysine, Methionine, Phenylalanine, Proline, Serine, Threonine, Tryptophan, Tyrosine, Valine.

Coconut Oil can be either left in original state of unrefined oil or compressed into a powder form.

Soybean Oil can be either left in original state of oil or compressed into a powder form.

Glutamine is left in the original state of powder, mixes well when water/liquid is added.

The invention claimed is:

1. A horse supplement comprising:
a) 40-50 wt % powder whey isolate;
b) 30-35 wt % powder coconut oil;
c) 10-15 wt % powder soybean oil; and
d) 0.75-1.25 wt % glutamine.

2. The horse supplement of claim 1 further comprising a flavorant.

3. The horse supplement of claim 1 wherein a flavorant is not included in said supplement.

4. The horse supplement of claim 1 wherein the glutamine is a powder.

5. A method of utilizing the horse supplement of claim 1 wherein a liquid is added to said horse supplement.

6. The method of claim 5 wherein the liquid is water.

\* \* \* \* \*